United States Patent [19]

Shira

[11] Patent Number: 4,782,205
[45] Date of Patent: Nov. 1, 1988

[54] METHOD OF WELDING INVOLVING WELD BEAD SHAPING AND ARC DEFLECTION AND APPARATUS FOR PRACTICING SAID METHOD

[76] Inventor: Chester S. Shira, 3634 7th Ave., Apt. 4C, San Diego, Calif. 92103

[21] Appl. No.: 65,435

[22] Filed: Jun. 25, 1987

[51] Int. Cl.[4] .................... B23K 9/00; B23K 9/16
[52] U.S. Cl. .................... 219/74; 219/137 R; 219/121.84
[58] Field of Search ............ 219/137 R, 137 WM, 74, 219/75, 121 FS, 124.1

[56] References Cited

U.S. PATENT DOCUMENTS

| | | | |
|---|---|---|---|
| 3,185,813 | 5/1965 | Kennedy | 219/74 |
| 3,296,408 | 1/1967 | Arnoldy | 219/74 |
| 3,539,756 | 11/1970 | Schwartzbart | 219/74 |
| 3,569,660 | 3/1971 | Houldcroft | 219/121 FS X |
| 3,838,243 | 9/1974 | Inagaki et al. | 219/75 X |
| 4,090,057 | 5/1978 | Okada | 219/75 X |
| 4,527,038 | 7/1985 | Cuny et al. | 219/75 |
| 4,625,095 | 11/1986 | Das | 219/137 WM |

*Primary Examiner*—E. A. Goldberg
*Assistant Examiner*—Catherine M. Sigda
*Attorney, Agent, or Firm*—John L. Gray

[57] ABSTRACT

A method and apparatus for welding involving directing a high velocity stream of gas at an angle to a welding arc in the direction of travel of the welding arc and onto the molten pool of metal formed by the arc as the molten pool solidifies, and a method and apparatus for injecting particles into the molten pool just prior to its solidification concurrently with the flow of high velocity gas.

8 Claims, 3 Drawing Sheets

METHOD OF WELDING INVOLVING WELD BEAD SHAPING AND ARC DEFLECTION AND APPARATUS FOR PRACTICING SAID METHOD

BACKGROUND OF THE INVENTION

At the present time apparatus for shielding welds from atmospheric gas that include a second nozzle for the introduction of additional gas utilize the additional gas as a blast to clear the nozzle of spatter and debris after welding or concentric nozzles with the outer nozzle the source of a second more economical shielding gas to reduce the need for more expensive shielding gases used in the inner nozzle.

There is no teaching in the literature of the utilization of a second gas to shape the weld bead. The deflection of an arc presently is accomplished by the use of magnetic fields since the arc itself is an electrical current conductor. Magnetic fields are used to deflect an arc in a manner to improve welding performance. However, there is no disclosure in the literature of the use of gas pressure to deflect a welding arc forward in the direction of travel to increase welding speed and at the same time to shape the weld bead.

SUMMARY OF THE INVENTION

The present invention utilizes a high velocity gas stream adjacent to and behind the arc in the direction of travel of the arc and inclined at an acute angle to the vertical axis of the arc so as to deflect electrical arcs forward and thus increase the welding speed and also shape weld beads being formed to improve the cross-sectional shape of the weld bead by overcoming surface tension and gravity forces and thus make the weld bead more useful. By deflecting the electrical arcs forward in the direction of travel and shaping the weld beads, permissible welding speeds are increased by approximately 50 percent. In fact, it is possible to produce high speed welds at high welding currents or energy levels in the overhead position utilizing the present invention. There are no prior methods known for bead shaping, arc deflection, and high speed welding in all welding positions, including overhead.

This high velocity flow of gas may be used without additional shielding gas if the material being welded does not have to be protected from the air. In the case of gas shielded welding this high velocity stream of gas may be introduced in the interior of the zone shielded by the shielding gas. Additionally, if required, particles of a material may be simultaneously injected into the molten weld pool just prior to its freezing.

Equipment used to practice this method is an integral part of this invention.

It is therefore an object of this invention to provide a method of welding wherein the weld bead is shaped prior to freezing by a stream of high velocity gas.

It is an additional object of this invention to provide a method whereby said high velocity stream of gas also deflects electrical arcs forward.

It is still another object of this invention to provide a method whereby particles may be introduced into the molten pool formed by the arc and shaped by the high velocity stream of gas just prior to the weld bead freezing.

It is still a further object of this invention to provide equipment to practice this method.

These, together with other objects and advantages of the invention will become more readily apparent to those skilled in the art when the following general statements and descriptions are read in the light of the appended drawings.

DETAILED DESCRIPTION OF THE INVENTION

Figure 1:
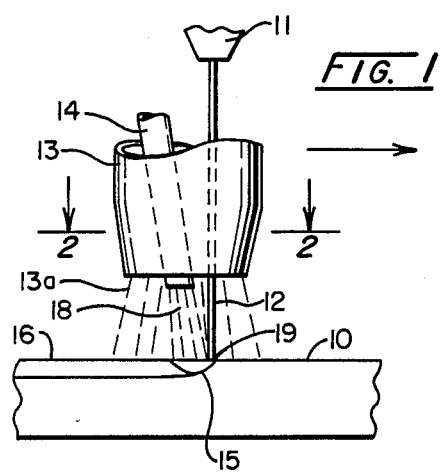
FIG. 1 is a side elevation view of the equipment used to practice the method of the instant invention utilizing a laser beam as the high energy welding source.

Referring to the drawings, in FIGS. 1, 3, 5, and 6, the direction of travel of the equipment practicing the method constituting a part of the present invention is shown by the arrow.

Referring more particularly to FIG. 1, the work being welded is shown at 10 with a laser source 11 and a laser beam 12.

The conventional gas shielding tube is shown at 13 delivering shielding gas 13a. While the invention is illustrated in FIGS. 1–4 with gas shielding welding equipment, it should be recognized that applicant's method and equipment may be used in the atmosphere when this will not deleteriously affect the weld. The inner tube 14 of high velocity gas 18 is shown inclined at an acute angle to the laser beam 12 and aimed at the molten pool 15 being formed as the laser source 11 and associated equipment is moved in the direction of the arrow. The solidified weld bead is shown at 16. The high velocity gas 18 deflects and blows away the plume of smoke coming from the welding operation providing a clear path for laser beam energy to impinge on the work 10. It also provides the operator with greater visibility at the juncture of the laser beam 12 and the molten pool 15.

The term "molten pool" is used throughout this application and the claims. It should be understood that the term "molten" also includes metal that is merely softened so that it may be manipulated by the high velocity gas stream 18 or which may be adequately softened to receive hard particles injected therein.

Figure 2:
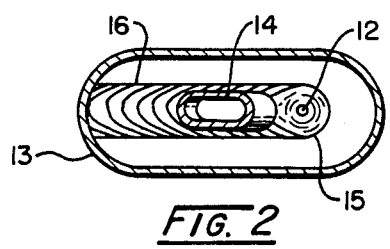
FIG. 2 is a section of FIG. 1 on a section line 2—2.

Referring now more particularly to FIG. 2, the delivery tube 13 for shielding gas 13a is shown oval in shape surrounding the laser beam 12 which is in contact with the work 10 in the molten pool 15. The tube 14 for the delivery of high velocity gas 18 is shown inclined at an acute angle to the axis of the laser beam 12. Also shown is the weld bead 16 which has been formed.

Figure 3:
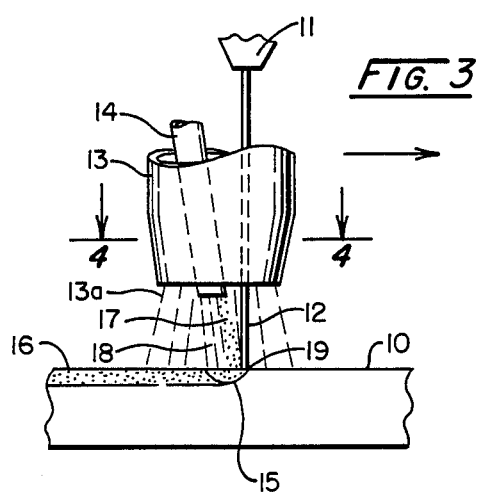
FIG. 3 is a side elevation view of a modification of the equipment shown in FIG. 1 utilizing the capability of injecting particles into the molten weld pool utilizing a laser beam as the high energy welding source.
Figure 4:
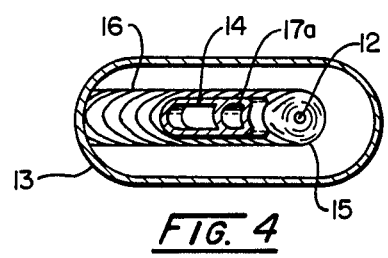
FIG. 4 is the section of FIG. 3 on a line 4—4.

Referring now more particularly to FIG. 3, a variation of the equipment used in practicing a variation of the method of the instant invention is shown whereby particles 17—17 may be injected directly into the molten pool 15 just prior to its freezing, thus providing a weld bead 16 which contains such particles. This is accomplished by means of a second tube 17a as shown in FIG. 4 which may be somewhat crescent in cross-sectional shape which permits the particles to be injected into the molten pool just prior to its freezing as the laser beam 12 moves in the direction of the arrows shown in FIG. 3. The stream of high pressure gas 18 perform several functions. It deflects the arc forward in the direction of travel as shown at 19 in FIGS. 1 and 3, can also be used to shape the weld bead as is discussed hereafter in reference to FIG. 7, and also assists in the injection of particles 17—17 in to the molten pool 15.

Figure 5:
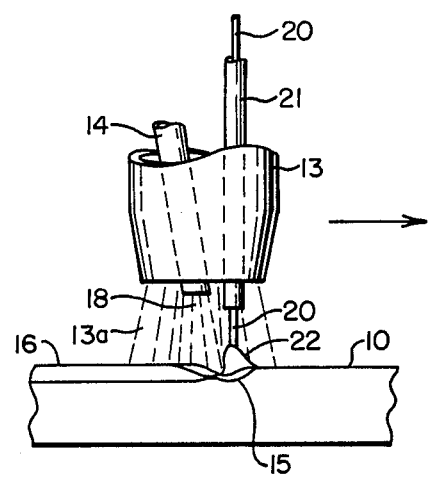
FIG. 5 is a side elevation view of the apparatus used in practicing the method of the present invention wherein the high energy source is gas metal arc welding.

FIG. 5 shows the method and equipment of the instant invention in utilizing gas metal arc welding. The consumable wire electrode 20 is continuously fed in through an appropriate carrier 21 and the arc is deflected forward as shown at 22 by means of the stream of high pressure gas 18.

Figure 6:
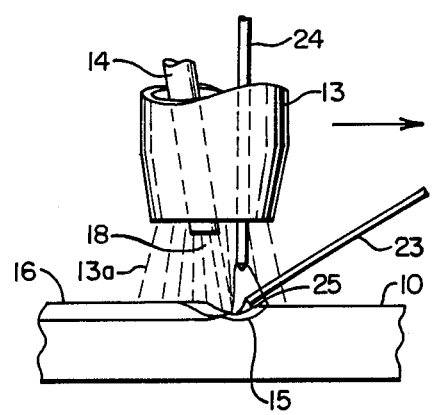
FIG. 6 is a side elevation view of the equipment utilized in practicing the present invention using an electrode and separate weld wire introduced into the welding zone.

FIG. 6 discloses welding equipment utilizing the present invention wherein weld metal 23 is fed into the arc existing between electrode 24 and the work 10. Again, the high pressure gas 18 moves the arc forward in the direction of travel as shown at 25.

It should be understood that the apparatus utilized shown in FIGS. 5 and 6 can embody the modification of the invention shown in FIGS. 3 and 4 whereby particles may be introduced into the molten pool just before it freezes and, of course, if the materials being welded are such that gas shielding tube 13 is not necessary, it may be omitted.

Figure 7:
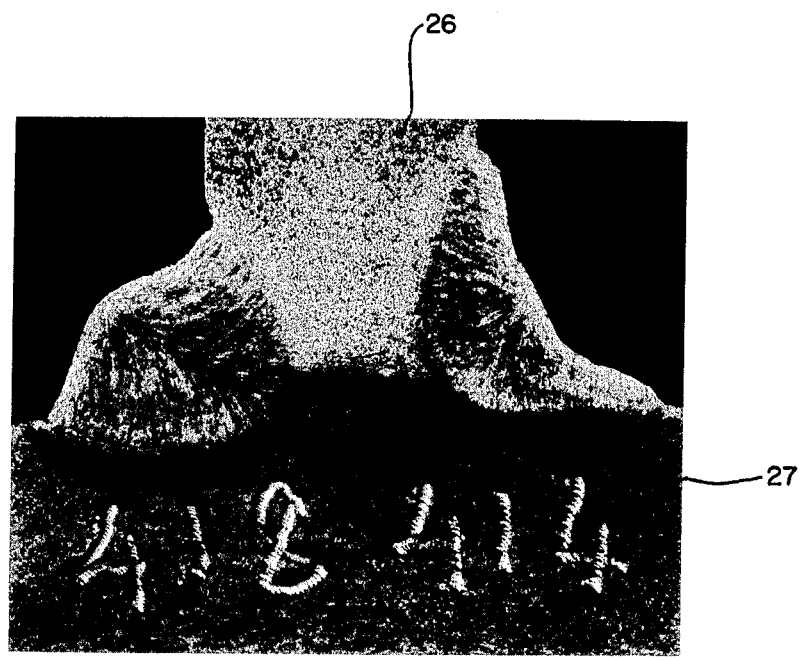
FIG. 7 is a photomicrograph of a section showing a weld bead formed in the conventional fashion and a weld bead formed utilizing the method and equipment constituting the present invention.

Referring now to FIG. 7, there is shown a photomicrograph of two welds in cross section. The weld designated 418 has been produced by conventional methods and equipment of the prior art. Weld 414 has been produced using identical variables used in producing weld 418 and, in addition, using the method and equipment of the instant invention. You will note that the weld of 414 is shaped as a filet weld between the member 26 which is welded to the base member 27. By use of the method of applicant's invention and the high pressure/high velocity gas 18 in the tube 14, this creates pressure on the molten weld pool and provides accelerated cooling of the weld. This pressure and accelerated cooling forces the weld to cool and solidify with a contour that is predictable, useful, and desirable. When the high velocity gas 18 flows through the tube 14, only the primary shielding gas in tube 13a is aspirated into the high velocity gas stream 18 thus maintaining the integrity of the shielding gas 13a surrounding the weld area.

Molten weld metal like any liquid is affected by surface tension. Depending upon the freezing rates and upon the quantity of molten metal present, surface tension forces cause welds to form surfaces that are rounded and generally convex in shape in cross section shown by the weld bead 418 of FIG. 7. Outside forces such as gravity and arc forces also influence the shape of freezing welds and under certain conditions can induce freezing prior to forming the convex shapes associated with surface tension forces. Utilizing a high velocity stream of gas in the present invention to overcome surface tension and gravity forces permits welds to be shaped in a manner that makes them more useful as shown in the weld 414 of FIG. 7. Also, the application of the high velocity stream of gas results in rapid cooling of the weldment. The weld mechanical properties on certain high strength steels are improved when rapid cooling after welding is utilized. Rapid cooling results in a finer grain size in the weld heat affected zone. Use of the high velocity gas stream 18 permits the use of substantially higher welding current and thus higher productivity when welding the family iron base alloys. Corrosion resistance and other important properties of many high alloy materials is also improved by the finer grain size, the improved bead shape and the faster cooling rate possible by the use of this invention. The configuration of the bead shaping can be altered to suit the size of weld being produced, to suit the process used and to suit the speed desired and a combination of gases can be used, if desirable. The angle of the bead shaping tube can be altered and its location relative to the weld pool being formed can be modified for specific applications,.

An important aspect of this invention is the injection of particles into the molten weld pool immediately prior to its freezing. By introducing the particles into the weld pool in the manner disclosed in this invention, degradation of the particles from the intense heat of the arc, high energy beam, or other heat sources is avoided and the maintenance of the desirable properties of the particles such as sharp edged features, points and the like is enjoyed. This also prevents contamination of the weld pool by excessive melting and alloying of the matrix by the particles.

While this invention has been described in its preferred embodiment, it is to be appreciated that variations therefrom may be made without departing from the true scope and spirit of the invention.

What is claimed:

1. A method of welding a joint involving weld bead shaping and arc deflection which comprises moving a welding arc in a direction along the joint to be welded, forming a molten pool of metal by said arc along said joint, which said molten pool of metal will form a weld bead upon solidification of said molten pool, directing a high velocity stream of gas from a source behind the direction of travel of said welding arc in the direction of travel of said welding arc and at such an angle to the said weld bead being formed and at such an angle to the vertical axis of said arc so that said high velocity stream of gas impinges directly onto the surface of the molten pool of metal formed by said arc to such an extent as to overcome surface tension and gravity forces of the molten pool as said molten pool solidifies, whereby the surface shape of said solidified weld bead may be controlled and the welding speed may be increased.

2. The method set forth in claim 1 wherein said high velocity stream of gas is directed at an acute angle to the vertical axis of said welding arc.

3. The method of claim 1 wherein protective shielding gas surrounds said high velocity stream of gas and said welding arc.

4. The method of claim 1 wherein particles are also injected into the molten pool of metal formed by the welding arc just before said molten pool freezes.

5. Welding equipment comprising a high energy source of heat for welding and forming a welding arc, means for moving said welding arc in a direction along the joint to be welded so as to form a molten pool of metal along said joint which said molten pool of metal will form a weld bead upon solidification of said molten pool, means for directing a high velocity stream of gas from a source behind the direction of travel of said welding arc in the direction of travel of said welding arc and at such an angle to the said weld bead being formed and at such an angle to the vertical axis of said arc so that the high velocity stream of gas impinges directly on the surface of the molten pool of metal formed by said arc to such an extent as to overcome surface tension and gravity forces of the molten pool as said molten pool solidifies.

6. The welding equipment set forth in claim 5 wherein said means for directing said high velocity stream of gas comprises a tube inclined at an acute angle to the vertical axis of said welding arc.

7. The welding equipment of claim 5 wherein said tube is provided with means for continuously injecting particles into said molten pool of metal.

8. The welding equipment of claim 5 comprising a first tubular member having two ends, one end being adapted to be positioned adjacent the joint to be welded, said one end being essentially oval in cross-sectional shape, said first tubular member being adapted to convey a high energy source of heat for said welding process in a portion thereof, a second tubular member having two ends, one end being adapted to be positioned adjacent the joint to be welded, and contained in said first tubular member for directing said high velocity stream of gas at an angle to said welding arc, said second tubular member being essentially oval in cross-sectional shape of said one end with the major axis of said second tubular member's oval cross-sectional shape positioned essentially in the same direction as the major axis of said first tubular member's cross-sectional shape, said second tubular member being positioned substantially adjacent to that portion of said first tubular member adapted to convey said high energy source of heat and the vertical axis of said second tubular member being inclined at an acute angle to the vertical axis of said first tubular member.

* * * * *